(12) United States Patent
Roh (10) Patent No.: US 8,781,138 B2
(45) Date of Patent: Jul. 15, 2014

(54) METHOD FOR OUTPUTTING BACKGROUND SOUND AND MOBILE COMMUNICATION TERMINAL USING THE SAME

(75) Inventor: Byoung Tack Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1078 days.

(21) Appl. No.: 12/194,449

(22) Filed: Aug. 19, 2008

(65) Prior Publication Data

US 2009/0074208 A1 Mar. 19, 2009

(30) Foreign Application Priority Data

Sep. 13, 2007 (KR) ........................ 10-2007-0092910

(51) Int. Cl.
*H03G 3/00* (2006.01)

(52) U.S. Cl.
USPC ......................................... 381/104; 381/73.1

(58) Field of Classification Search
USPC ........................................................ 381/73.1
See application file for complete search history.

(56) References Cited

U.S. PATENT DOCUMENTS

| | | | |
|---|---|---|---|
| 6,658,064 B1* | 12/2003 | Rotola-Pukkila et al. | 375/295 |
| 2003/0107478 A1* | 6/2003 | Hendricks et al. | 340/311.2 |
| 2003/0142833 A1* | 7/2003 | Roy et al. | 381/73.1 |
| 2005/0101262 A1 | 5/2005 | Lee et al. | |
| 2009/0292535 A1 | 11/2009 | Seo | |

FOREIGN PATENT DOCUMENTS

| | | | |
|---|---|---|---|
| KR | 2005-0045142 A | 5/2005 | |
| KR | 2006-0083862 A | 7/2006 | |
| KR | 10-2007-0042595 A | 4/2007 | |
| KR | 10-2007-0072792 A | 7/2007 | |

* cited by examiner

*Primary Examiner* — David Vu
*Assistant Examiner* — Jonathan Han
(74) *Attorney, Agent, or Firm* — Jefferson IP Law, LLP (57) ABSTRACT

A method for outputting a background sound and a mobile communication terminal using the same are provided. The method includes outputting of the background sound during voice communication, and controlling of the volume of the background sound output in correspondence to the volume of a communication voice are disclosed. The mobile communication terminal includes a background sound processing unit for controlling a volume of the background sound in correspondence to a volume level of the communication voice, and an audio processing unit for controlling the volume of the background sound under the control of the background sound processing unit and for outputting both the background sound and the communication voice.

32 Claims, 4 Drawing Sheets

Interpretation of Frame Type, Mode Indication and Mode Request fields

| Frame Type | Mode Indication | Mode Request | Frame content (AMR mode, comfort noise, or other) |
|---|---|---|---|
| 0 | 0 | 0 | AMR 4,75 kbit/s |
| 1 | 1 | 1 | AMR 5,15 kbit/s |
| 2 | 2 | 2 | AMR 5,90 kbit/s |
| 3 | 3 | 3 | AMR 6,70 kbit/s (PDC-EFR) |
| 4 | 4 | 4 | AMR 7,40 kbit/s (TDMA-EFR) |
| 5 | 5 | 5 | AMR 7,95 kbit/s |
| 6 | 6 | 6 | AMR 10,2 kbit/s |
| 7 | 7 | 7 | AMR 12,2 kbit/s (GSM-EFR) |
| 8 | - | - | AMR SID |
| 9 | - | - | GSM-EFR SID |
| 10 | - | - | TDMA-EFR SID |
| 11 | - | - | PDC-EFR SID |
| 12-14 | - | - | For future use |
| 15 | - | - | No Data (No transmission/No reception) |

From 3GPP TS 26.101 V7.0.0

METHOD FOR OUTPUTTING BACKGROUND SOUND AND MOBILE COMMUNICATION TERMINAL USING THE SAME

PRIORITY

This application claims the benefit under 35 U.S.C. §119(a) of a Korean patent application filed in the Korean Intellectual Property Office on Sep. 13, 2007 and assigned Serial No. 2007-0092910, the entire disclosure of which is hereby incorporated by reference.

BACKGROUND OF THE INVENTION

1. Field of the Invention

The present invention relates to a technique for outputting a background sound in a mobile communication terminal. More particularly, the present invention relates to a method for outputting a background sound and a mobile communication terminal using the same that enables outputting of a background sound during voice communication.

2. Description of the Related Art

In general, the term "mobile communication terminal" refers to a terminal, such as a personal mobile communication terminal, a Personal Digital Assistant (PDA) terminal, a smart phone, an International Mobile Telecommunication 2000 (IMT-2000) terminal, and a wireless Local Area Network (LAN) terminal, that may implement both mobile communication and various functions using application programs while being carried by a user.

Due to advances in communication technologies, mobile communication terminals have become compact in size and light in weight, and are now equipped with various services, such as an MP3 player service, a digital camera service, a navigation service, and an Internet access service. As a result, the mobile communication terminals are functioning as complex communication terminals and have become popular.

Meanwhile, a background sound is utilized in image media, such as movies and advertisements, to produce a distinctive atmosphere. The function of outputting a background sound during voice communication is being developed and applied to the mobile communication terminals.

However, in conventional mobile communication terminals, when a background sound is output during voice communication, the volume of the background sound is low enough to enable the user to clearly hear the voice of the counterpart. Therefore, it is difficult for the user to increase the volume of a background sound even when the user wants to listen to the background sound more clearly for example while being on hold.

Therefore, a need exists for an improved apparatus and method of controlling of volume of a background sound output in correspondence to the volume of a communication voice.

SUMMARY OF THE INVENTION

An aspect of the present invention is to address the above-mentioned problems and/or disadvantages and to provide at least the advantages described below. Accordingly, an aspect of the present invention is to provide a method for outputting a background sound that enables automatic control of the volume of a background sound in correspondence to the volume of a voice during voice communication, and a mobile communication terminal using the same.

In accordance with an aspect of the present invention, a method for outputting a background sound is provided. The method includes checking, upon reception of a request for communication, setting of outputting of a background sound, and implementing, in the case of the setting of the background sound, communication while controlling a volume of the background sound in correspondence to a volume of a communication voice and outputting the controlled volume of the background sound.

In accordance with another aspect of the present invention, a mobile communication terminal for outputting a background sound is provided. The terminal includes a background sound processing unit for controlling a volume of a background sound in correspondence to a volume level of a communication voice, and an audio processing unit for controlling the volume of the background sound under the control of the background sound processing unit, and for outputting both the background sound and the communication voice.

A method for outputting a background sound and a mobile communication terminal using the same according to exemplary embodiments of the present invention enable automatic control and output the volume of the background sound in response to an output of a counterpart voice during voice communication, thereby enabling the user to hear the background more clearly without additional manipulation of the mobile communication terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description of exemplary embodiments of the present invention, the term 'background sound' refers to any sound that may be output from a mobile communication terminal.

Also, in the following description of the exemplary embodiments, the term 'communication voice' refers to a voice of the counterpart that is received by a mobile communication terminal of the user in the form of digital voice data transmitted from the counterpart terminal, and to which the received digital voice data are converted to be output. Generally, although the communication voice may contain the voice of the user, in exemplary embodiments of the present invention, for helping to understand a present general inventive concept, the communication voice will be described only as the voice of the counterpart for convenience sake.

Hereinafter, exemplary embodiments of the present invention will be described in more detail with reference to the accompanying drawings.

Figure 1:
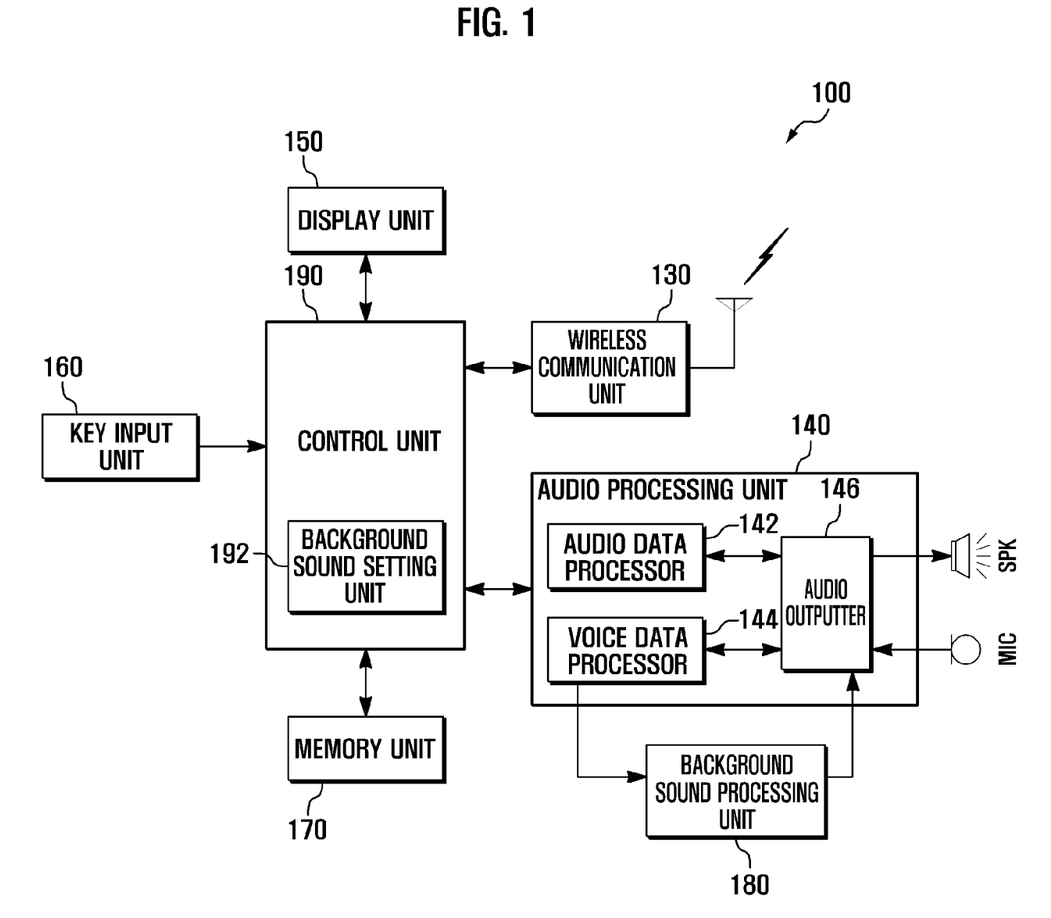
FIG. 1 is a schematic block diagram illustrating a mobile communication terminal according to an exemplary embodiment of the present invention.

FIG. 1 is a block diagram schematically illustrating a mobile communication terminal according to an exemplary embodiment of the present invention.

Referring to FIG. 1, the mobile communication terminal 100 according to an exemplary embodiment of the present invention includes a wireless communication unit 130, an audio processing unit 140, a key input unit 160, a display unit 150, a memory unit 170, a background sound processing unit 180, and a control unit 190.

The wireless communication unit 130 performs transmission/reception of data for wireless communication of the mobile communication terminal 100. The wireless communication unit 130 may include a Radio Frequency (RF) transmitter (not shown) for up-converting a frequency of a transmitted signal and for amplifying the transmitted signal, and an RF receiver (not shown) for low-noise amplifying a received signal and for down-converting the frequency of the amplified signal. Furthermore, the wireless communication unit 130 may receive data through a wireless channel and output the received data to the control unit 190. The wireless communication unit 130 may transmit data output from the control unit 190 through a wireless channel.

The audio processing unit 140 outputs the communication voice of the counterpart through a speaker (SPK) during voice communication, and converts an analog voice signal (for example, the user's voice) input through a microphone (MIC) to digital voice data (hereinafter, referred to as 'voice data'). Furthermore, the audio processing unit 140 according to an exemplary embodiment of the present invention may output the voice together with a background sound according to a setting of the user. That is, the volume of the background sound is controlled under the control of the background sound processing unit 180 that will be described in more detail below, and the background sound and the communication voice are simultaneously output. For doing this, the audio processing unit 140 includes an audio data processor 142, a voice data processor 144, and an audio outputter 146.

The audio data processor 142 processes an audio signal. That is, the audio data processor 142 decodes a content file to convert the decoded content file to an audio signal. Further, the audio data processor 142 codes an audio signal input from the microphone (MIC) and converts the coded audio signal to provide it to the control unit 190.

The voice data processor 144 converts voice data input from the control unit 190 to an analog voice signal (hereinafter, referred to as 'voice signal') and transmits the voice signal to the audio outputter 146. The voice data processor 144 converts an audio signal input through the audio outputter 146 to digital audio data and provides it to the control unit 190.

Meanwhile, in an exemplary embodiment of the present invention, the voice data processor 144 will be described below with an example of mutually converting the voice data and the voice signal using an Adaptive Multi-Rate (ARM) codec having a variable bit rate, but is not limited thereto. That is, various codecs including a bit rate fixed codec (for example, an Enhanced Full Rate (EFR) codec) may be used.

The voice data processor 144 determines existence of a SIlence Descriptor (SID) frame in real time and informs the background sound processing unit 180 of the result. This process is carried out to check outputting of a communication voice and will be described more in detail in the description of the background sound processing unit 180.

The audio outputter 146 combines and amplifies the analog signals from the audio data processor 142 and the voice data processor 144, and outputs the combined and amplified signal to the speaker (SPK) or an earphone jack. In this process, the audio outputter 146 outputs the background sound with a reference volume or an amplified volume under the control of the background sound processor 180. The reference volume and the amplified volume are set by a background sound setting unit 192 that will be described in detail below.

The display unit 150 visually provides a menu of the mobile communication terminal 100, user data input by the user, function setting information, and other various information to the user. In an exemplary implementation, the display unit 150 may include a Liquid Crystal Display (LCD). In this case, the display unit 150 may include a controller for controlling the LCD, a video memory for storing video data, and other components of the LCD. Meanwhile, if the display unit has a touch screen, the display unit 150 may perform some or all of the functions of an input unit.

The key input unit 160 receives a control signal of the user that may control the mobile communication terminal 100 and transmits the control signal to the control unit 190. For doing this, the key input unit 160 according to an exemplary embodiment of the present invention has control keys (not shown) for controlling the operation of the mobile communication terminal 100 and a plurality of number keys (not shown) for inputting letters or numbers.

The memory unit 170 stores downloaded content and data created by the user, as well as application programs for functional operations of the mobile communication terminal 100 according to an exemplary embodiment of the present invention. The memory unit 170 may include a program area and a data area.

An operating system for booting the mobile communication terminal 100 and application programs for optional functions of the mobile communication terminal 100, such as an audio reproducing function and a still image or moving image reproducing function, are stored in the program area of the memory unit 170. The memory unit 170 may include one or more buffers for temporarily storing user data, such as sound source files, still images, and moving images, generated during execution of an application program.

User data generated during use of the mobile communication terminal 100 are stored in the data area. Various contents, such as audio files and video files, used in an exemplary embodiment of the present invention as a background sound and other various data files may be stored in the data area.

The background sound processing unit 180 determines the volume of a communication voice and controls the audio outputter 146 to control the volume of a background sound based on the result. The background sound processing unit 180 determines the volume of a communication voice in real time. Then, when the communication voice is not output, the background sound processing unit 180 controls the audio outputter 146 to increase the volume of the background sound. Furthermore, the background sound processing unit 180 may determine that the outputting of the communication voice does not exist when the voice data are converted to the SID frame during the converting process of the voice data transmitted from the counterpart terminal. Therefore, the background sound processing unit 180 continues to communicate with the voice data processor 144 and determines in real time whether the received voice data are converted to the SID frame.

The control unit 190 controls the overall operation of and signal flows between internal blocks of the mobile communication terminal 100. That is, the control unit 190 controls signal flows between elements including the wireless communication unit 130, the audio processing unit 140, the key input unit 160, the memory unit 170, and the background sound processing unit 180.

Upon receiving a user request, the control unit 190 according to an exemplary embodiment of the present invention sets a content file that is to be output as the background sound during voice communication. For doing this, the control unit 190 includes the background sound setting unit 192.

The background sound setting unit 192, according to an exemplary embodiment of the present invention, sets information (e.g., a reference volume, an amplified volume, a background sound, and the like) related to the outputting of the background sound. The reference volume refers to a volume of the background sound output with the communication voice when the communication voice of the counterpart is output. Therefore, in an exemplary implementation, the reference volume may be set to a volume that makes it possible for the terminal user to clearly hear the communication voice of the counterpart. Further, as the amplified volume is a volume at which the background sound is output when the communication voice of the counterpart not being output, the amplified volume may be set higher than the reference volume. The background sound is played back from a content file selected by the user during voice communication and the content file may be selected from various multimedia files.

Hereinafter, a method for outputting a background sound according an exemplary embodiment of the present invention will be described in detail. The structure of the mobile communication terminal 100 will be more apparent from the following description of the method for outputting a background sound.

Figures 2, 3:
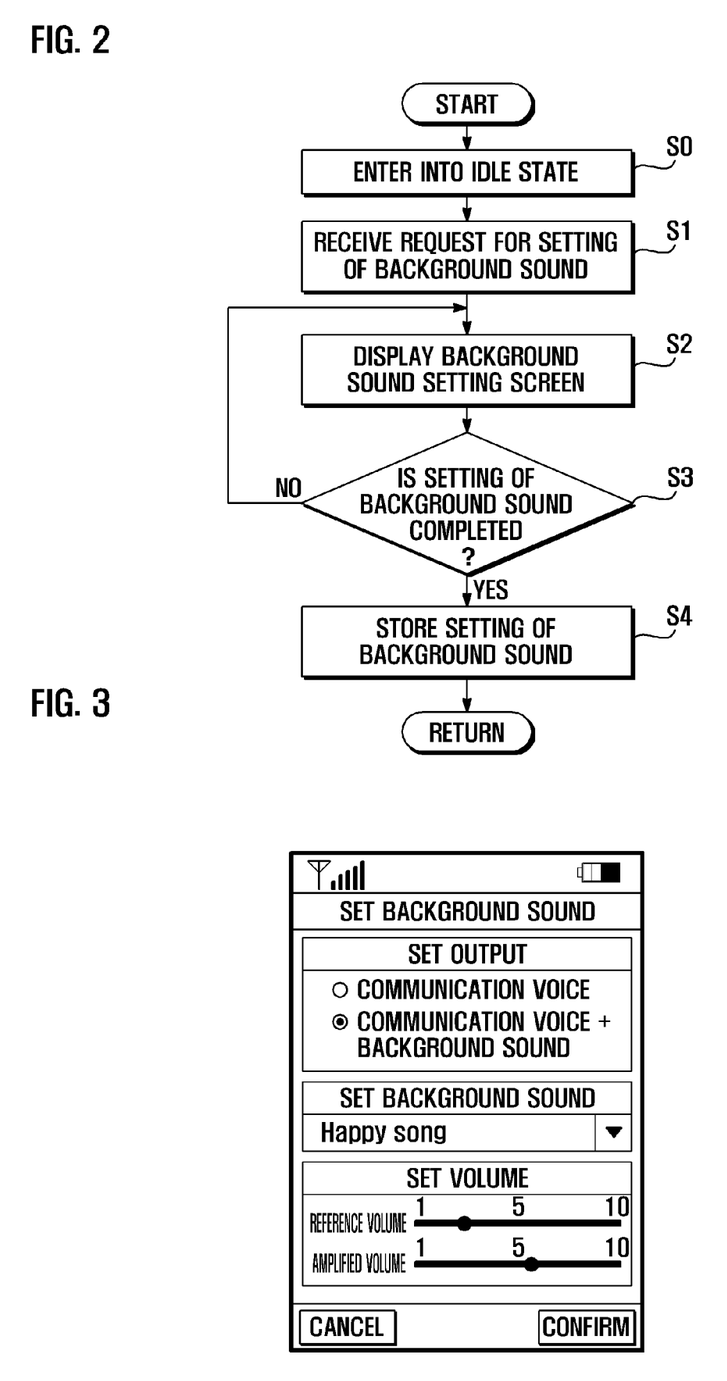
FIG. 2 is a flowchart schematically illustrating a method for setting a background sound according to an exemplary embodiment of the present invention.
FIG. 3 is a view schematically illustrating a screen for setting a background sound according to an exemplary embodiment of the present invention.

FIG. 2 is a flowchart schematically illustrating a method for outputting a background sound according to an exemplary embodiment of the present invention. FIG. 3 is a view schematically illustrating a screen for setting a background sound according to an exemplary embodiment of the present invention. Hereinafter, the method for setting a background sound according to an exemplary embodiment of the present invention will be described with reference to FIGS. 1 to 3.

Referring to FIG. 2, the method for setting a background sound according to an exemplary embodiment of the present invention starts with step S0 for allowing a mobile communication terminal 100 to enter into an idle state in a normal operation after power is turned on for the mobile communication terminal 100.

In step S1, a request for setting of a background sound is received by the mobile communication terminal 100 in the idle state. The setting request may be entered through a specific key of the key input unit 160 by the user, or by selecting an item from a menu.

Upon reception of the request for setting of the background sound, in step S2, the background sound setting unit 192 of the control unit 190 displays a background sound setting screen on the display unit 150. The background sound setting unit 192 displays a background sound setting screen as illustrated in FIG. 3 to the user. The background sound setting screen according to an exemplary embodiment of the present invention includes a section for selecting outputting of a background sound, a section for selecting a content file that is to be used as a background sound, and a section for setting a reference volume and an amplified volume.

Upon displaying of the setting screen of the background sound, the user inputs a content file of the background sound which the user desires to hear during voice communication, the reference volume, the amplified volume and the like. Although the exemplary embodiment of the present invention is described with an example of setting the reference volume and the amplified volume within the output range of 1 though 10, the present invention is not limited thereto.

After the user completes an input and setting of the background sound in step S3, the background sound setting unit 192 stores information about the background sound input by the user and completes setting of the background sound in step S4. Then, the information about the background sound may be stored in the memory unit 170.

After setting all of the background sound, the reference, and amplified volumes, the mobile communication terminal 100, according to an exemplary embodiment of the present invention, outputs the background sound together with a communication voice during voice communication using the information about the background sound. Hereinafter, this process will be described in detail.

Figure 4:
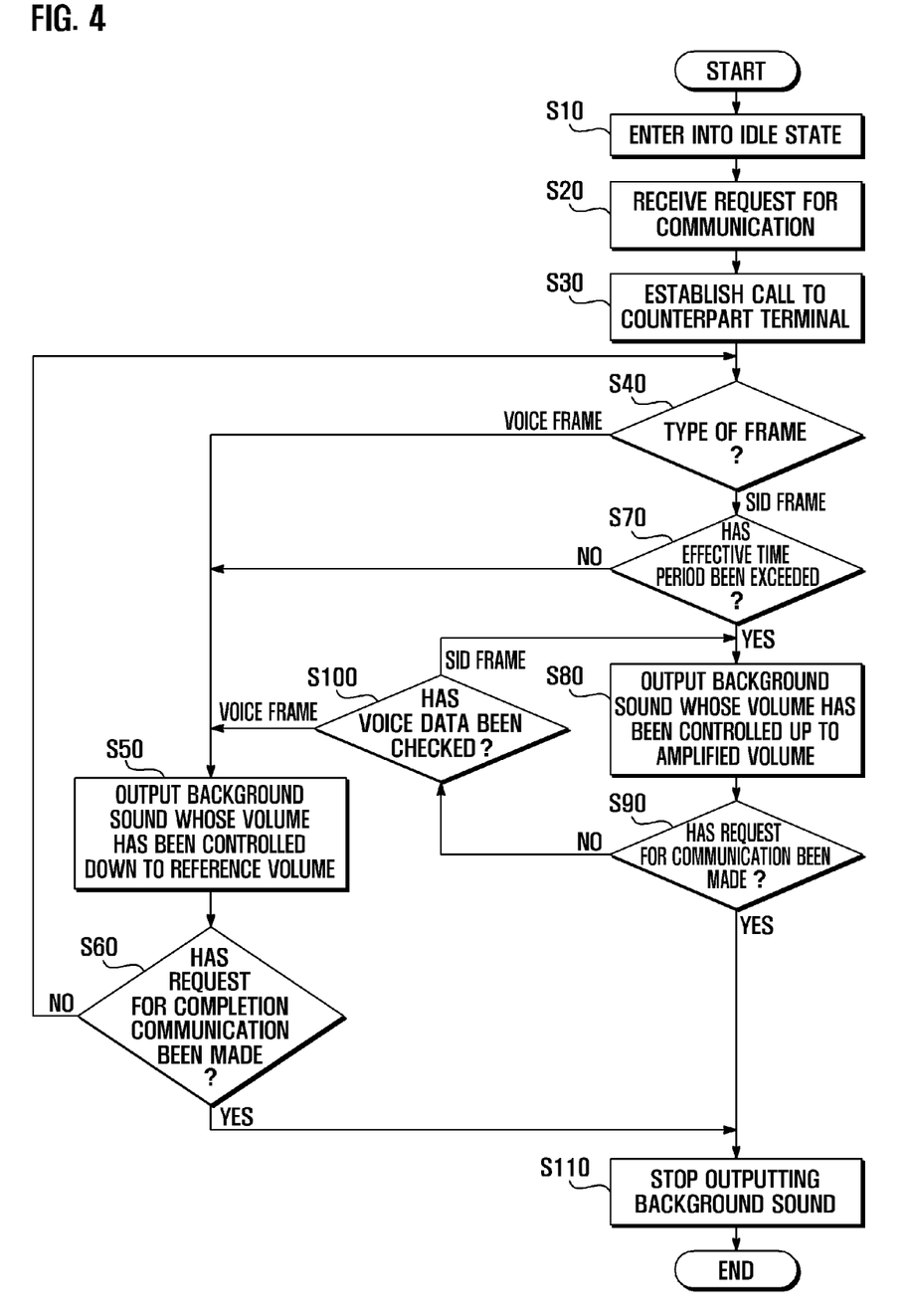
FIG. 4 is a flowchart schematically illustrating a method for outputting a background sound according to an exemplary embodiment of the present invention.

FIG. 4 is a flowchart schematically illustrating a method for outputting a background sound according to an exemplary embodiment of the present invention.

Figure 5:
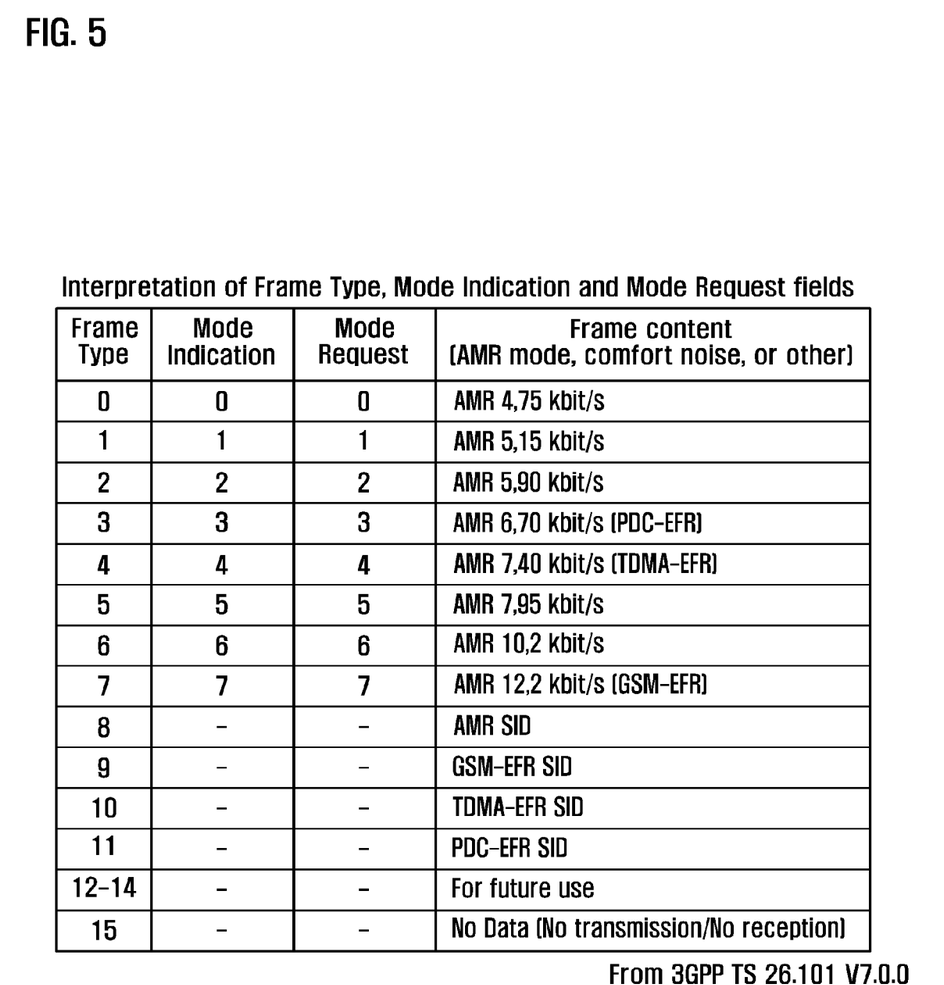
FIG. 5 is a view illustrating a frame structure of an ARM codec according to an exemplary embodiment of the present invention.

FIG. 5 is a view illustrating a frame structure of an ARM codec. Hereinafter, the method for outputting a background sound according to an exemplary embodiment of the present invention will be described in detail with reference to FIGS. 1 through 5.

Referring to FIG. 4, the method for outputting a background sound according to an exemplary embodiment of the present invention starts with step S10 of allowing the mobile communication terminal 100 to enter into an idle state in a normal operation mode after power is turned on for the mobile communication terminal 100.

In step S20, the mobile communication terminal 100 receives a request for voice communication. Step 20 of receiving the request for voice communication includes both the case in which the user requests voice communication with a counterpart, for example by dialing a specific telephone number through the key input unit 160 of the mobile communication terminal 100, and the case in which voice communication is requested by the counterpart terminal.

Upon reception of a request for voice communication, the control unit 190 performs step S30 for establishing a call with the counterpart terminal. At the same time, the control unit 180 determines whether the background sound is set to be output.

When the background sound is not set to be output during voice communication, although not illustrated, the control unit 190 performs voice communication as in a conventional terminal. On the other hand, when the background sound is set to be output, that is, the background sound and the reference volume, and the amplified volume are set by the above-mentioned process of setting the background sound, the control unit 190 proceeds to step S40.

In step S40, the background sound processing unit 180 confirms the voice data input from the counterpart terminal in real time. This process will be described in more detail below.

The mobile communication terminal 100, according to an exemplary embodiment of the present invention, outputs a communication voice from the counterpart terminal through the following process. First, the voice data received by the wireless communication unit 130 is transmitted to the audio processing unit 140 through the control unit 190. The voice data have been previously encoded by the ARM codec. After the voice data processor 144 of the audio processing unit 140 decodes the voice data using the ARM codec, it converts the decoded voice data into an analog voice signal and transmits the analog voice signal to the audio outputter 146. The audio outputter 146 amplifies the analog voice signal and outputs the amplified voice signal.

In an exemplary implementation, the voice data coded by the ARM codec may include a frame including a voice (hereinafter, referred to as 'a voice frame') and a frame including no sound, noise, or a voice (hereinafter, referred to as 'a SIlence Descriptor (SID) frame'). FIG. 5 is a view illustrating a frame structure of an ARM codec. Referring to FIG. 5, frame types 0 to 7 are available for voice, and frame types 8 to 11 including SID frames are available for SID.

In the case of the voice data created by the ARM codec, the section having the counterpart voice includes voice frames, and the section having no voice, that is, where no sound is input from the counterpart terminal, includes SID frames. Therefore, in an exemplary embodiment of the present invention, during the process of converting the voice data into the communication voice, it is determined whether a currently converted frame is either a voice frame or an SID frame.

This process is performed in real time during voice communication. Therefore, during the voice communication, the voice data processor 144 analyzes the voice data that is being transmitted from the counterpart terminal and decodes those data. At the same time, the voice data processor 144 determines whether the frame of voice data that is being currently decoded is the voice frame or the SID frame, and informs the background sound processing unit 180 of the determination result. The background sound processing unit 180 determines whether the current frame of voice data is the voice frame or the SID frame based on the signal transmitted from the voice data processor 144.

When the currently converted frame is determined to be a voice frame in step S40, the background sound is output with the reference volume in step S50. The background sound processing unit 180 controls the audio outputter 146 to output the background sound with the reference volume set through the background sound setting unit 192.

The content file used for the background sound is output via the audio data processor 142. That is, when the content file stored in the memory unit 170 is transmitted through the control unit 190 to the audio data processor 142, the audio data processor 142 decodes the content file to convert an analog audio signal, and transmits the analog audio signal to the audio outputter 146.

Therefore, after the audio outputter 146 controls the volume of the analog audio signal to the reference volume under the control of the background signal processing unit 180, it mixes the communication voice with the analog audio signal and outputs the mixed signal through the speaker (SPK).

Meanwhile, the time point when the background sound is initially output is not limited. That is, although an example of outputting the background sound after establishing a call is presented in an exemplary embodiment of the present invention, it is also possible to establish the call after outputting the background sound. In addition, according to a method for outputting a background sound of an exemplary embodiment of the present invention, when a request for voice communication is received while a content file is being played back, it is preferable to continuously play back the content file. In this case, the volume of the content file that is being played back in step S50 is output with the reference volume.

During step S50, the user hears the background sound with the reference volume during communication with the counterpart voice.

When the user inputs a request for completion of voice communication in step S60, the control unit 190 completes voice communication and stops outputting the background sound in step S110.

In contrast, when the voice communication continues, the control unit 190 proceeds to step S40 and repeats steps S40 to S60. That is, during the voice communication, the background sound processing unit 180 continues to determine whether SID frames are input. If no SID frame is input, the background sound processing unit 180 controls the audio outputter 146 to allow the background sound to be continuously output with the reference volume.

On the other hand, in step S50 of outputting the communication voice with the background sound, when the counterpart stops inputting his or her voice, the counterpart terminal transmits voice data having an SID frame to the mobile communication terminal 100. Then, in step S40, the voice data processor 144 of the mobile communication terminal 100 determines existence of the SID frame in the process of converting the voice data, and informs the background sound processing unit 180 of the checked result.

The background sound processing unit 180 that has recognized the input of the SID frame proceeds to step S70 and is in an idle state for a preset time period (threshold period). This process is performed to ignore the case in which an SID frame is input for a very short time period and voice data are input again. The threshold period is set to one second in an exemplary embodiment of the present invention, but is not limited thereto. Also, the threshold period may be adjusted by a user.

In step S70, the background sound processing unit 180 is in an idle state for one second and checks an input of the SID frame. If a voice frame is again input for the threshold period in step S70, the background sound processing unit 180 proceeds to step S50, and thereby continues to output the background sound with the reference volume. However, in step S70, if the SID frames are continuously input for more than one second, the background sound processing unit 180 proceeds to step S80, thereby outputting the background sound with the preset amplified volume. Thus, the user may hear the background sound that is being output at a level higher than the one output in step S50.

During step S80 of outputting the background sound with the amplified volume, if a request for completion of voice communication is received in step S90, the control unit 190 completes the voice communication and discontinues outputting of the background sound in step S110. However, if only the SID frames are continuously input with no demand for completion of voice communication and no input of a voice frame in steps S90 and S100, the background sound processing unit 180 repeats steps S80 to S100. That is, the background sound processing unit 180 controls the audio outputter 146 to continue to output the background sound with the amplified volume.

On the other hand, when the voice frame is input in step S100, the background sound processing unit 180 recognizes that the counterpart restarts the input of a voice, proceeds to step S50, and enables the background sound to be output with the reference volume.

Thereafter, the above-mentioned steps are repeated. That is, the processes of outputting the background sound with the reference volume when SID frames are input, and with the amplified volume when voice frames are input respectively are performed until the voice communication is completed.

As described above, the method for outputting a background sound according to the exemplary embodiment of the present invention and the mobile communication terminal using the same enable outputting of a background sound together with a communication voice during voice communication. In addition, when a voice from the counterpart is output, the background sound is output at a lower level to make it possible to clearly hear the voice of the counterpart, and when the voice from the counterpart is not output, the background sound is output at a higher level. Thus, since the exemplary embodiment of the present invention enables the volume of the background sound to be automatically controlled according to outputting of the counterpart voice, it is possible to hear the background sound more clearly with no additional manipulation by the user.

A method for outputting a background sound and a mobile communication terminal according to the exemplary embodiments of the present invention are not limited to the illustrated example, but may be variously modified without departing from the spirit of the invention by those skilled in the art.

For example, it has been described in the exemplary embodiments as one example that a background sound that is output during voice communication is preset in the setting of the background sound and the preset background sound is output during voice communication. However, the present invention is not limited to these embodiments and may include other various instances. As an example, the control unit may use a currently used content file instead of a preset background sound as a background sound when a request for voice communication is input while the user is using (hearing or viewing) the content file. In this case, stopping of outputting a background sound that has been described in the above embodiment is omitted. A step of outputting the content file with the previous volume after the voice communication is completed is also omitted.

Furthermore, in the above-mentioned embodiments, a communication voice has been defined as an output of the counterpart voice, and it has been described as an example that the background sound is output at a higher volume only when the counterpart voice is not output. However, the communication voice may be defined as at least one of the counterpart voice and the user voice, and it is possible to output the background sound together with a higher volume only when neither the counterpart voice nor the user voice is output. In this case, the background sound processing unit may check conversion of an SID frame from the audio data processor and, at the same time, determine whether the user voice is input from at least one of the microphone and the audio outputter.

Furthermore, the case of setting the reference volume to a fixed value (volume value) has been described as one example in the exemplary embodiments of the present invention. However, the present invention is not limited thereto, and it is possible to apply the present invention to various applications for example, setting the volume of the background sound to be variably output corresponding to the volume of the currently output communication voice. For example, the volume of the background sound may maintain one third of the volume of the communication voice.

In addition, in the exemplary embodiments, the case of outputting a background sound from a mobile communication terminal has been described. However, besides the exemplary embodiments of the present invention, the present invention is variously applicable to electric devices that may output a background sound during voice communication.

While exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims and their equivalents.

What is claimed is:

1. A method for outputting a background sound, the method comprising:
   determining, upon receipt of a request for communication, whether a background sound is to be output concurrently with the requested communication;
   monitoring a volume level of a communication voice during the communication;
   continually adjusting a volume level of the background sound according to the volume level of the communication voice; and
   outputting the adjusted background sound and the communication voice.

2. The method of claim 1, wherein the outputting of the background sound comprises:
   determining whether the communication comprises a frame including a voice or a SIlence Descriptor (SID) frame including no sound in real time;
   automatically increasing, in the case of the SID frame, the volume level of the background sound; and
   outputting the background sound with the increased volume level and the communication voice.

3. The method of claim 2, wherein the outputting of the background sound further comprises:
   outputting, in the case of the voice frame, the background sound with a reference volume; and
   outputting, in the case of the SID frame, the background sound with an amplified volume higher than the reference volume.

4. The method of claim 3, further comprising:
   controlling, upon outputting of the voice frame, the volume level of the background sound to be the reference volume; and
   outputting the background sound with the reference volume level, in outputting the background sound with the amplified volume.

5. The method of claim 3, further comprising:
   setting the reference volume level, the amplified volume level, and the background sound before receiving the request for the communication.

6. The method of claim 3, wherein the communication voice comprises a voice of a counterpart user that is received in a form of voice data transmitted from a counterpart terminal.

7. The method of claim 3, wherein the communication voice comprises a voice of a terminal user that is input through a microphone.

8. The method of claim 6, wherein the outputting of the background sound further comprises converting the voice data to the communication voice by using at least one of an Adaptive Multi-Rate (AMR) codec and an Enhanced Full Rate (EFR) codec.

9. The method of claim 1,
wherein the communication voice comprises at least one of a counterpart voice and a user voice, and
wherein the outputting of the background sound comprises:
determining a volume level of the background sound corresponding to at least one of the counterpart voice and the user voice; and
outputting the background sound with the determined volume level.

10. The method of claim 9, wherein the determining of the volume level of the background sound comprises:
increasing, when both of the counterpart voice and the user voice comprise a SID frame, the volume of the background sound.

11. The method of claim 3, wherein the reference volume is set to a level corresponding to a volume level of the communication voice in outputting the background sound with the reference volume.

12. A mobile communication terminal comprising:
a controller for determining whether a background sound is set to be output concurrently with a communication;
a background sound processing unit for monitoring a volume of communication voice during the communication, and continually adjusting a volume of the background sound according to the volume level of communication voice; and
an audio processing unit for controlling the adjusted volume level of the background sound and for outputting the adjusted background sound and the communication voice.

13. The mobile communication terminal of claim 12, wherein the background sound processing unit determines whether the communication voice comprises a frame including a voice or a SIlence Descriptor (SID) frame including no sound in real time, and controls the audio processing unit to automatically increase the volume level of the background sound when the communication voice comprises the SID frame and output the background sound with the increased volume level.

14. The mobile communication terminal of claim 13, further comprising:
a background sound setting unit for setting a reference volume level that is a volume of the background sound when output concurrently with the communication voice, an amplified volume that is a volume level of the background sound output when the communication voice comprises the SID frame, and the background sound.

15. The mobile communication terminal of claim 14, wherein the audio processing unit further comprises an audio outputter for, upon establishment of a call, outputting the background sound together with the communication voice with the reference volume level and for outputting the background sound with the amplified volume under the control of the background sound processing unit.

16. The mobile communication terminal of claim 15, wherein the communication voice comprises a voice of a counterpart that is received in the form of the voice frame transmitted from a counterpart terminal to be output.

17. The mobile communication terminal of claim 15, wherein the communication voice further comprises a voice of a terminal user that is input through a microphone.

18. The mobile communication terminal of claim 16, wherein the audio processing unit further comprises a voice data processor for converting the voice data received by using at least one of an Adaptive Multi-Rate (AMR) codec and an Enhanced Full Rate (EFR) codec to a communication voice and for transmitting the communication voice to the audio outputter.

19. The mobile communication terminal of claim 18, wherein the voice data processor checks for the SID frame during conversion of the digital voice data in real time and informs the background processing unit of the checked result.

20. The mobile communication terminal of claim 19, wherein, upon confirmation of the SID frame through the voice data processor, it is determined that there is no output of the communication voice.

21. The mobile communication terminal of claim 12,
wherein the communication voice comprises at least one of a counterpart voice and a user voice, and
wherein the controller determines the volume level of the background sound corresponding to at least one of the counterpart voice level and the user voice level.

22. The mobile communication terminal of claim 21, wherein the controller determines the volume level of the background sound to be increasing when both of the counterpart voice and the user voice comprise a SIlence Descriptor (SID) frame.

23. A method for outputting a background sound in a user terminal, the method comprising:
establishing a communication with a counterpart terminal;
determining if a background sound is to be output concurrently with the communication; and
if the background sound is to be output, outputting the background sound continually adjusted according to a volume level of a communication voice.

24. The method of claim 23, further comprising:
determining whether the communication comprises a frame including voice or a SIlence Descriptor (SID) frame including no sound; and
continually adjusting the volume level of the background sound according to the determined existence of the communication voice frame or SID frame.

25. The method of claim 24, wherein the establishing of the communication with the counterpart terminal comprises:
receiving voice data from the counterpart terminal; and
converting the voice data to the communication voice using at least one of an Adaptive Multi-Rate (AMR) codec and an Enhanced Full Rate (EFR) codec.

26. The method of claim 25, wherein the determining if the voice data includes the SID frame is performed during the converting of the voice data to the communication voice.

27. The method of claim 26, wherein the determining of the existence of the SID frame indicates the nonexistence of the communication voice.

28. The method of claim 27, wherein the continual adjusting of the volume of the background sound comprises setting the volume of the background sound to a reference level.

29. The method of claim 26, further comprising determining the nonexistence of the SID frame which indicates the existence of the communication voice.

30. The method of claim 29, wherein the continual adjusting of the volume level of the background sound comprises setting the volume of the background sound to an amplified level that is higher than a reference level.

31. The method of claim 23,
wherein the communication voice comprises at least one of a counterpart voice and a user voice, and
wherein the continual adjusting comprises outputting the background sound at a volume corresponding to at least one of the counterpart voice level and the user voice level.

32. The method of claim 31, wherein the continual adjusting comprises:
   increasing, when both of the counterpart voice and the user voice comprise a SIlence Descriptor (SID) frame, the volume level of the background sound.

* * * * *